US007850748B2

(12) United States Patent
Lee et al.

(10) Patent No.: US 7,850,748 B2
(45) Date of Patent: Dec. 14, 2010

(54) BURNER FOR FUEL REFORMER OF FUEL CELL SYSTEM

(75) Inventors: Doo-hwan Lee, Suwon-si (KR); Kang-hee Lee, Yongin-si (KR); Hyun-chul Lee, Hwaseong-si (KR); Tae-sang Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 12/014,375

(22) Filed: Jan. 15, 2008

(65) Prior Publication Data

US 2009/0029207 A1 Jan. 29, 2009

(30) Foreign Application Priority Data

Jul. 23, 2007 (KR) ..................... 10-2007-0073478

(51) Int. Cl.
*B01J 7/00* (2006.01)

(52) U.S. Cl. ........................... 48/61; 422/198; 422/188; 422/189; 48/127.9; 431/248; 431/314; 431/337; 431/340; 431/341; 431/201; 431/198; 431/195; 431/130; 431/132; 126/106; 126/108; 126/109; 122/17.1; 122/18.1; 122/18.2

(58) Field of Classification Search ................. 431/248, 431/314, 337, 340–341, 201, 198, 195, 130, 431/132; 126/106, 108–109, 112, 17.1; 122/17.1, 122/18.1–18.2
See application file for complete search history.

(56) References Cited

U.S. PATENT DOCUMENTS

| | | | | |
|---|---|---|---|---|
| 1,439,186 | A * | 12/1922 | Mummery | 431/201 |
| 7,125,540 | B1 * | 10/2006 | Wegeng et al. | 423/650 |
| 2004/0115577 | A1 * | 6/2004 | Maenishi et al. | 431/75 |
| 2004/0146763 | A1 * | 7/2004 | Pondo et al. | 429/26 |

* cited by examiner

*Primary Examiner*—Alexa D. Neckel
*Assistant Examiner*—Kaity V. Handal
(74) *Attorney, Agent, or Firm*—Stein McEwen, LLP

(57) ABSTRACT

A fuel reformer burner for a polymer electrolyte membrane fuel cell (PEMFC) system includes a first tube through which a fuel for a fuel reformer is supplied and a second tube through which anode-off gas (AOG) is supplied from a fuel cell stack. The second tube is not connected to the first tube, and an inlet line through which an air is supplied is connected to the first tube.

22 Claims, 6 Drawing Sheets

100
STACK
10
5
AIR
COOLING WATER
HEX3
H3
COOLING WATER RESERVOIR
130
WATER
140
HEX4
H4
Air/H2O
200
CO REMOVAL
252
250
251
CO SHIFT
AIR
182
180
ANODE OFF GAS
HEX2
H2
REFORMER
220
DESULFURIZER
210
OUTSIDE
HEX1
H1
BURNER
230
FUEL
270
PUMP
260
WATER
280

H₂ OUT
4
4a
O₂ OUT
H₂ IN
O₂ IN
10
1
6
2
3
6
4
4a
4
COOLING
WATER OUT
5a
COOLING
WATER IN
5

BURNER FOR FUEL REFORMER OF FUEL CELL SYSTEM

CROSS-REFERENCE TO RELATED APPLICATIONS

This application claims the benefit of Korean Patent Application No. 2007-73478, filed on Jul. 23, 2007 in the Korean Intellectual Property Office, the disclosure of which is incorporated herein by reference.

BACKGROUND OF THE INVENTION

1. Field of the Invention

Aspects of the present invention relate to a burner for heating a fuel reformer that generates hydrogen, and more particularly, to a fuel reformer burner that can burn both a fuel gas and a hydrogen gas and that has increased combustion efficiency.

2. Description of the Related Art

A fuel cell is an electricity generation system that transforms chemical energy directly into electrical energy through a chemical reaction between oxygen and hydrogen, the hydrogen generally being contained in a hydrocarbon group material, such as methanol, ethanol, or natural gas.

A polymer electrolyte membrane fuel cell (PEMFC) system is a highly efficient next generation distribution type system that generates electricity and heat using an electrochemical reaction between hydrogen and air. The PEMFC fuel processor system includes a fuel cell stack and a fuel processor as main components and includes a fuel tank and a fuel pump as auxiliary components. The fuel cell stack has a structure in which a few to a few tens of unit cells, each formed of a membrane electrode assembly (MEA) and separators, are stacked. The fuel processor includes a fuel reformer and a shift reactor.

Hydrogen produced from the fuel processor is supplied to an anode electrode of the fuel cell stack and generates electricity and heat in the fuel cell stack through an electrochemical reaction with oxygen, which is supplied to a cathode electrode.

A reforming reaction in the fuel reformer and a shift reaction in the shift reactor are performed at high temperatures. Thus, the fuel processor includes a burner that provides heat required for the above reactions.

The fuel reformer burner generates heat by burning a fuel gas, and at this point, the fuel gas can be mainly hydrocarbon gas, such as, a city gas including mainly methane gas. However, in order to increase the efficiency of the PEMFC system, the burner must be able to burn not only the hydrocarbon fuel gas but also hydrogen gas. In other words, it is essential to include a device and method for burning unreacted hydrogen gas included in an anode-off gas (AOG) exhausted from the PEMFC system because the usage of the hydrogen gas in the fuel cell stack is generally 70 to 85% and thus, unreacted hydrogen gas is exhausted out of the fuel cell stack. Accordingly, the efficiency of the overall generation system can be increased by recovering the wasted hydrogen gas and using it as a fuel for the burner of the fuel processor.

Also, until a normal operation is achieved after starting up the fuel processor, hydrogen gas generated from the fuel processor is not supplied to the fuel cell stack for a few tens of minutes since the hydrogen includes a large amount of carbon monoxide (CO). Such large amount of CO can poison an MEA catalyst in the unit cell. The wasted hydrogen gas that includes a large amount of CO can be used as a fuel gas for the burner. In this way, the consumption of energy required for starting up the PEMFC system can be reduced.

In order to increase efficiency of the PEMFC system, a burner that can produce heat required for the fuel processor by using not only the hydrocarbon gas but also hydrogen gas included in the AOG as a fuel gas is beneficial. For this purpose, there is need for a burner that can efficiently and safely burn both types of fuels (a fuel gas and hydrogen gas).

In a conventional burner for a fuel reformer, air and AOG are mixed at a fuel inlet of the burner. However, hydrogen gas has a much faster burning rate than that of a fuel gas (e.g., ten times faster than methane). Thus, when burning the fuel gas, there is a high possibility that flames can proceed in a reverse direction of the fuel gas causing a back fire.

SUMMARY OF THE INVENTION

To address the above and/or other problems, aspects of the present invention provide a fuel reformer burner of a polymer electrolyte membrane fuel cell (PEMFC) system in which the fuel reformer burner can burn both a fuel gas and an anode-off gas (AOG) and can prevent back fire when the AOG is burnt.

Aspects of the present invention also provide the PEMFC system having a fuel reformer burner.

According to an aspect of the present invention, there is provided a fuel reformer burner including: a first tube through which a fuel for a fuel reformer is supplied; and a second tube through which an anode-off gas (AOG) is supplied from a fuel cell stack, wherein the second tube is not connected to the first tube, and an inlet line through which an air is supplied is connected to the first tube.

According to an aspect of the present invention, the second tube and the first tube may be concentric.

According to an aspect of the present invention, the second tube may be formed inside a circumference of the first tube.

According to an aspect of the present invention, the second tube may be formed outside a circumference of the first tube.

According to an aspect of the present invention, an ejection surface disposed between a first end of the first tube and a first end of the second tube through which a plurality of ejection holes are formed and through which the AOG is ejected.

According to an aspect of the present invention, the ejection surface may be angled between about 45 to 90 degrees with respect to the lengthwise direction of the second tube, and the ejections holes may be approximately perpendicular to the ejection surface.

According to an aspect of the present invention, there is provided a polymer electrolyte membrane fuel cell (PEMFC) system having a fuel reformer burner that includes: a first tube through which a fuel for a fuel reformer is supplied; a second tube through which AOG is supplied from a fuel cell stack, wherein the second tube is not connected to the first tube, and an inlet line through which an air is supplied is connected to the first tube; and an AOG supply line connected from the fuel cell stack to the second tube to supply the anode-off gas (AOG) to the second tube.

According to an aspect of the present invention, the PEMFC system may further include a hydrogen by-pass line connected from a point between the fuel reformer and the fuel cell stack to the second tube to flow hydrogen generated from the fuel reformer to the fuel reformer without passing through the fuel cell stack.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
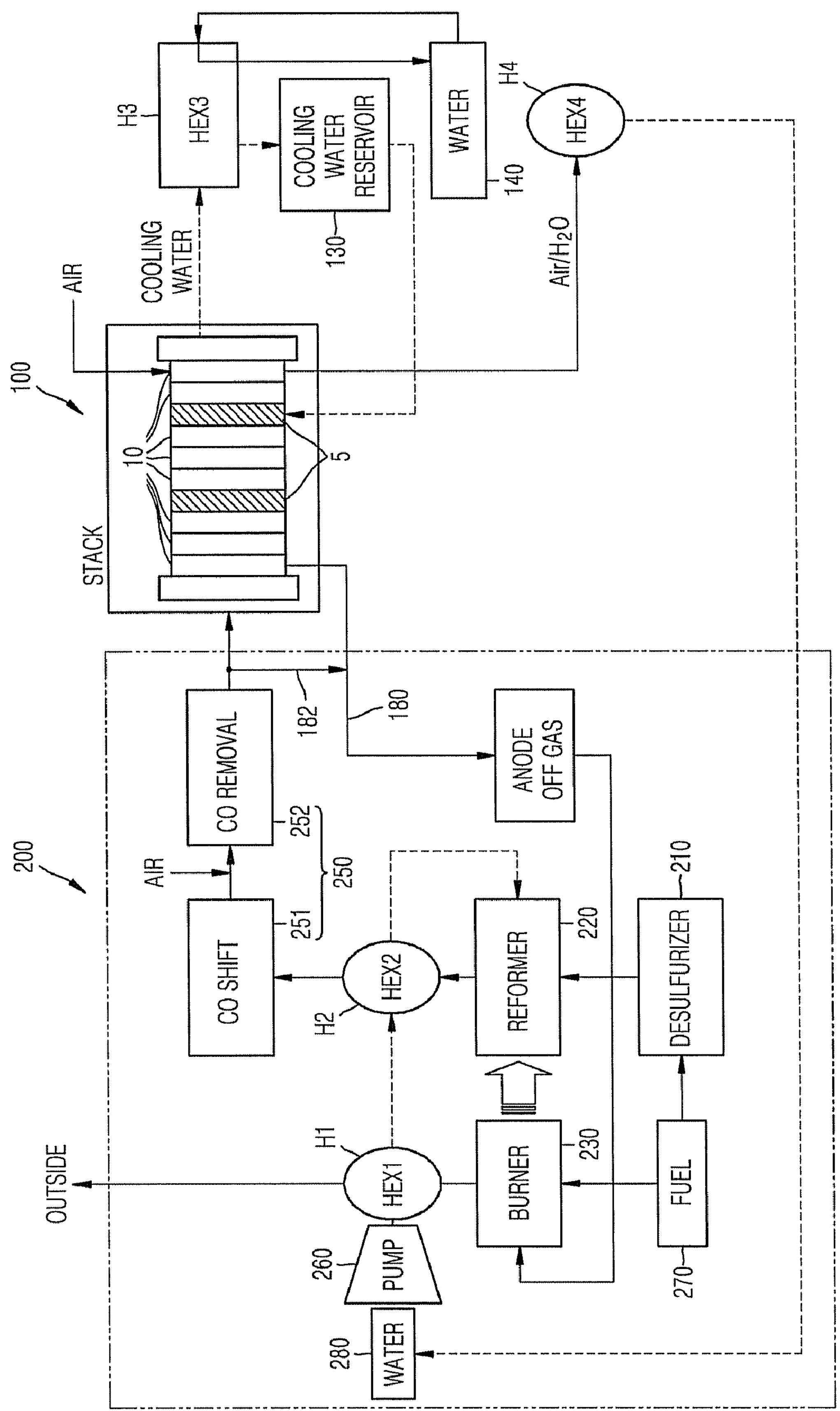
FIG. 1 is a block diagram of a polymer electrolyte membrane fuel cell (PEMFC) system having a fuel reformer burner according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

FIG. 1 is a block diagram of a polymer electrolyte membrane fuel cell (PEMFC) system having a fuel reformer burner according to an embodiment of the present invention. Referring to FIG. 1, the PEMFC system includes a fuel processor 200, a fuel cell stack 100, and a cooling system that cools the fuel cell stack 100.

The fuel processor 200 includes a desulfurizer 210, a fuel reformer 220, a fuel reformer burner 230, a water supplying pump 260, first and second heat exchangers H1 and H2, and a CO removing unit 250 comprising a CO shift reactor 251 and a CO remover 252.

Hydrogen is generated in the fuel reformer 220. The fuel reformer 220 is heated by the fuel reformer burner 230 burning a hydrocarbon group gas, which is a fuel source, entering from a fuel tank 270. Hydrogen is generated by a chemical reaction of the hydrocarbon group gas as the fuel source and steam supplied from a water tank 280 by the water supply pump 260. The steam is generated from the water supplied from the water tank 280 by the first and second heat exchangers H1 and H2. The hydrocarbon group gas is passed through the desulfurizer 210 to remove sulfur components therefrom before entering the fuel reformer 220. At this point, $CO_2$ and CO are generated in the fuel reformer 220 as by-products. If a fuel containing CO is supplied to the fuel cell stack 100, electrodes are poisoned resulting in a rapid reduction of the performance of the fuel cell. Therefore, the content of CO in the fuel at an outlet of the fuel reformer 220 is controlled by installing the CO shift reactor 251 and the CO remover 252. In the CO shift reactor 251, a chemical reaction to generate $CO_2$ by reacting CO and steam occurs; and in the CO remover 252, an oxidation reaction to generate $CO_2$ by directly reacting CO with oxygen occurs. Water supplied by the water supplying pump 260 is heated with combustion gas exhausted from the fuel reformer burner 230 and a reformer gas exhausted from the fuel reformer 220 in the first and second heat exchangers H1 and H2, respectively.

Figure 2:
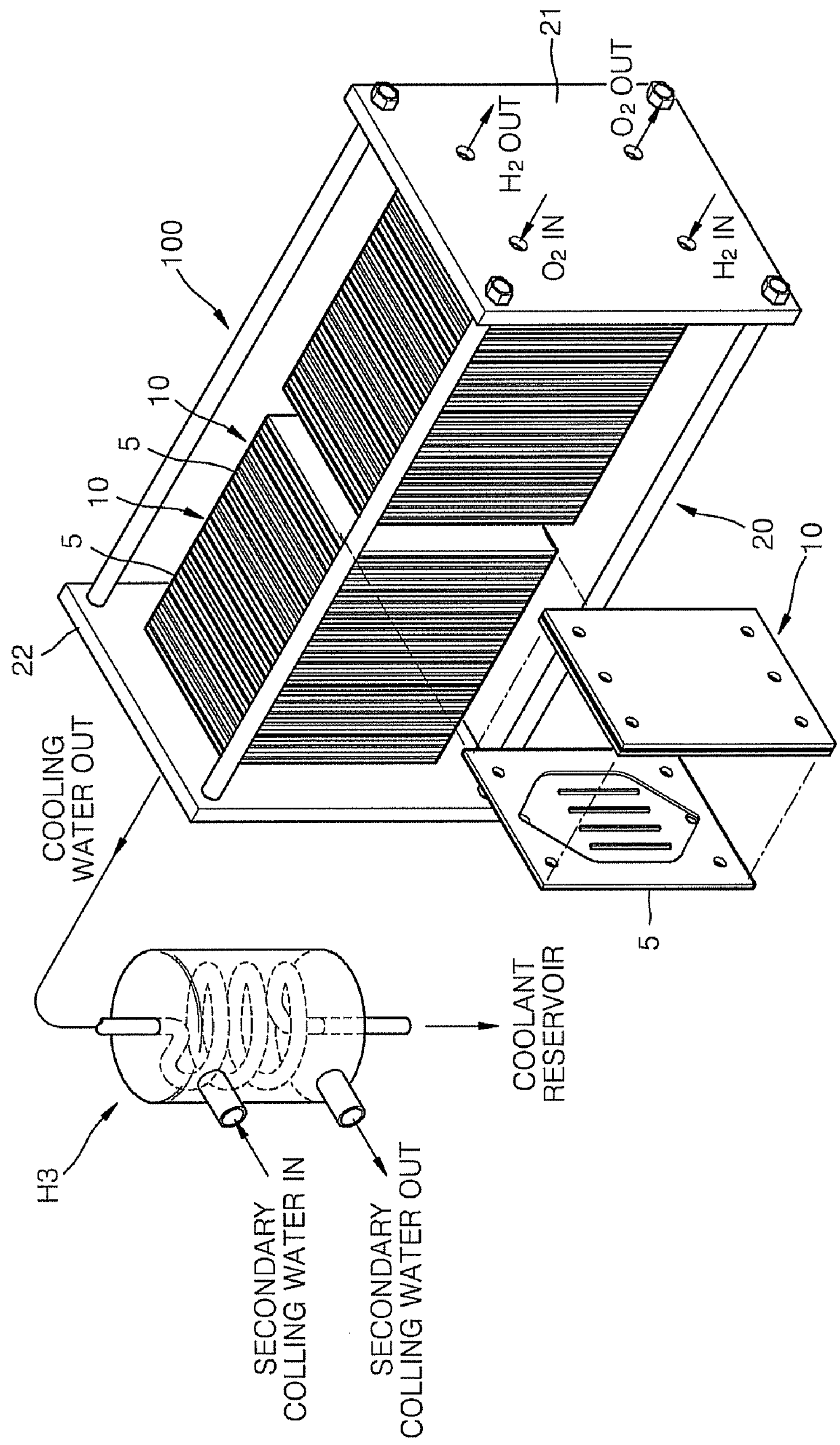
FIG. 2 is a perspective view showing a portion of a cooling system of the fuel cell stack of FIG. 1, according to an embodiment of the present invention.
Figure 3:
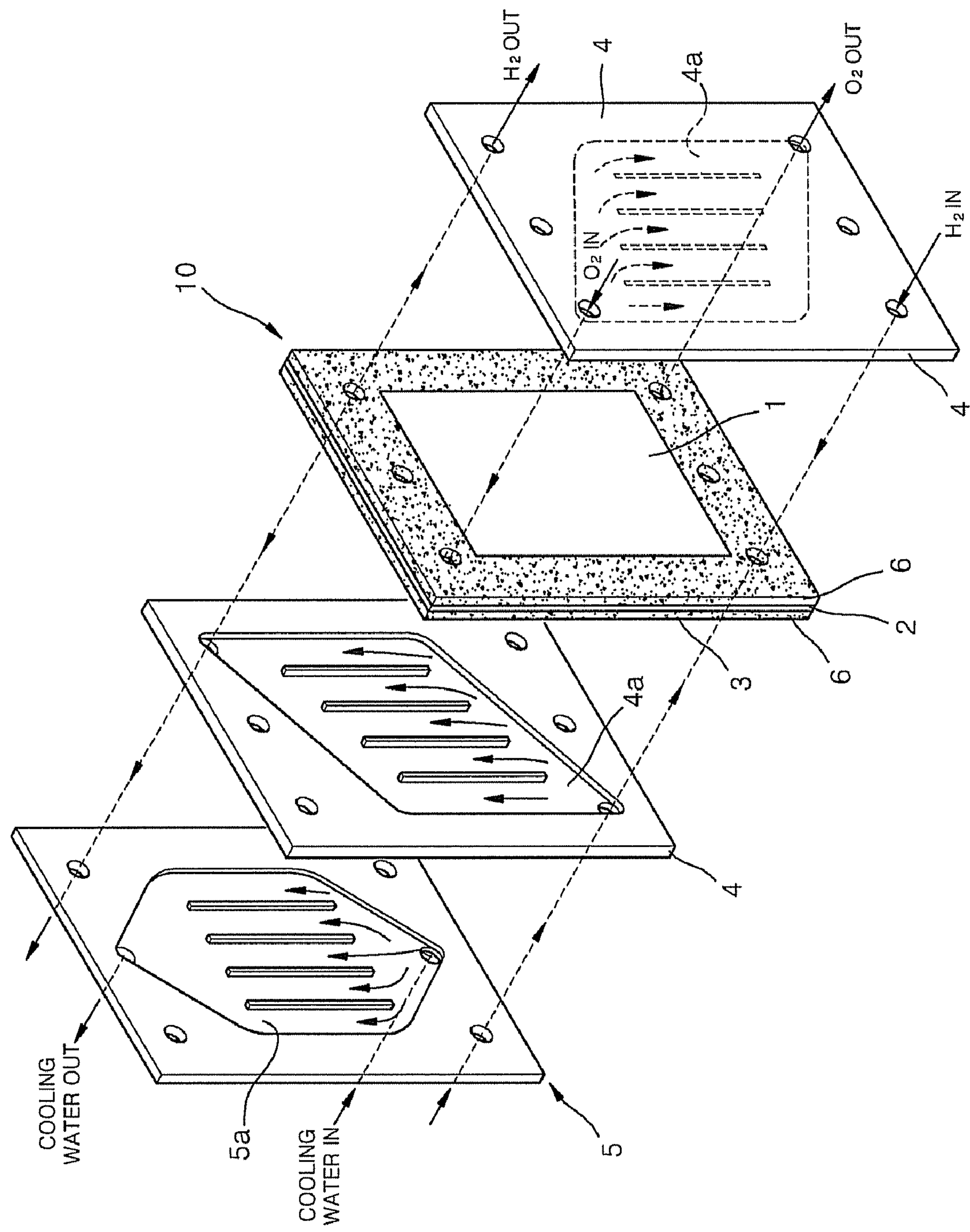
FIG. 3 is an exploded perspective view showing the flow of fluids between cooling plates and unit cells of FIG. 2, according to an embodiment of the present invention.

FIG. 2 is a perspective view showing a portion of the cooling system of the fuel cell stack 100 of FIG. 1, according to an embodiment of the present invention, and FIG. 3 is an exploded perspective view showing the flow of fluids between cooling plates and unit cells of FIG. 2.

Referring to FIGS. 2 and 3, a plurality of unit cells 10 are stacked in the fuel cell stack 100. Each of the unit cells 10 includes an electrolyte membrane 2, and a cathode electrode 1 and an anode electrode 3 disposed on either side of the electrolyte membrane 2. A separator 4 on which flow channels 4*a* supply an air or hydrogen gas to each of the cathode and anode electrodes 1 and 3 is formed between the unit cells 10. A gasket 6 to seal the unit cell 10 is formed between the cathode and anode electrodes 1 and 3 and the separators 4.

The fuel cell stack 100 includes a plurality of cooling plates 5 and a heat exchanger H3. One cooling plate 5, for passing cooling water for heat exchange may be installed between every several unit cells 10. The cooling water absorbs heat from the fuel cell stack 100 by passing through flow channels 5*a* of the cooling plate 5, and the cooling water that has absorbed heat is cooled in the heat exchanger H3 by secondary cooling water. Afterwards, the cooling water from the heat exchanger H3 is re-circulated in the fuel cell stack 100 through a cooling water reservoir 130 (refer to FIG. 1).

End plates 21 and 22 are respectively formed on ends of the fuel cell stack 100. An oxygen (air) supply hole $O_2$ IN, an oxygen (air) recovery hole $O_2$ OUT, a fuel (hydrogen gas) supply hole $H_2$ IN, and a fuel (hydrogen gas) recovery hole $H_2$ OUT are formed in the end plate 21. A cooling water supply hole (not shown) and a cooling water (not shown) recovery hole are formed in the end plate 22. At least one of each of the cooling water supply and recovery holes, the oxygen (air) supply $O_2$ IN and recovery holes $O_2$ OUT, and the fuel (hydrogen) supply $H_2$ IN and recovery holes $H_2$ OUT are formed in each of the cooling plate 5, the unit cell 10, and the separator 4. Thus, fuel (air and hydrogen gas) or cooling water is supplied through the above-described holes, and the fuel or the cooling water is discharged through the above-described holes. A gas that contains unreacted hydrogen recovered from the fuel (hydrogen gas) recovery hole $H_2$ OUT is described as anode-off gas (AOG).

Referring to FIG. 1, a coolant stored in the cooling water reservoir 130 is supplied to the cooling plates 5 in the fuel cell stack 100 in a liquid state, and exits the fuel cell stack 100 in a vapor state after absorbing heat in the fuel cell stack 100. The coolant is cooled through a heat exchange in the heat exchanger H3 with secondary cooling water supplied from a water tank 140 and is stored in the cooling water reservoir 130.

A mixture of excess air and steam exhausted from the cathode electrode 1 of the fuel cell stack 100 is cooled in a heat exchanger H4 where the steam is condensed into water and is recovered to the water tank 280.

Hydrogen gas produced before the PEMFC system reaches a normal operation after starting up the fuel processor 200 contains a large amount of CO. Thus, the hydrogen gas cannot be used as a fuel for the PEMFC system but can be used as a fuel for the fuel reformer burner 230. For this purpose, in the present embodiment, an AOG supply line 180 is connected to a rear end of the fuel cell stack 100, and a hydrogen by-pass line 182 that supplies hydrogen gas produced at an early stage of start up to the fuel reformer burner 230 is formed between the CO remover 252 and the fuel cell stack 100. The hydrogen by-pass line 182 may be connected to the AOG supply line 180.

Figure 4:
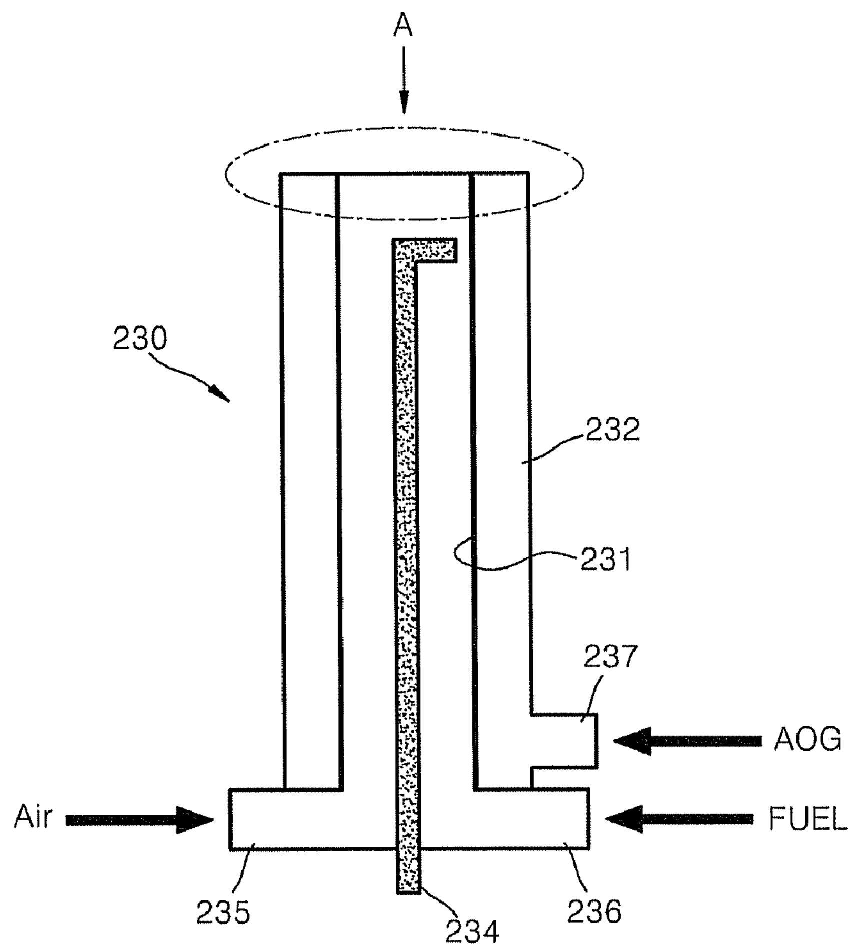
FIG. 4 is a cross-sectional view of a fuel reformer burner according to an embodiment of the present invention.

FIG. 4 is a cross-sectional view of a fuel reformer burner 230 according to an embodiment of the present invention. In the specification, like reference numerals are used to indicate elements that are substantially the same, and thus, detailed descriptions thereof will not be repeated. Referring to FIG. 4, the fuel reformer burner 230 includes a first tube 231 through which a hydrocarbon fuel and air (or oxygen) are ejected and a second tube 232 through which AOG is ejected. An air inlet 235 and a fuel gas inlet 236 are connected to the first tube 231. A city gas containing primarily methane can be supplied through the first tube 231. Also, ethane, propane, butane, pentane, dimethylether, LPG, LNG, or a mixture of these gases can be supplied through the first tube 231.

A hydrogen gas inlet 237 is connected to the second tube 232. The AOG supply line 180 is connected to the hydrogen gas inlet 237 so that anode off gas (AOG) from the anode electrode 3 of the fuel cell stack 100 can be supplied to the hydrogen gas inlet 237. Also, the hydrogen by-pass line 182 connected between the front end of the fuel cell stack 100 and the AOG supply line 180 is installed. The hydrogen by-pass line 182 may be directly connected to the second tube 232 without being connected to the AOG supply line 180.

The first tube 231 and the second tube 232 can be concentrically formed. The second tube 232 can be formed around an outer circumference of the first tube 231. The first tube 231 and the second tube 232 need not be connected to each other or can be formed in one unit.

The first tube 231 and the second tube 232 can be formed of a material having heat resistance and oxidation resistance, such as SUS301 stainless steel. An electric igniter 234 having an end installed with a predetermined gap, for example, 2 mm from an inner wall of the first tube 231, is formed in the first tube 231. When a predetermined direct current voltage, for example, 110V is applied to the electric igniter 234, a spark is formed between the end of the electric igniter 234 and the first tube 231, and thus, when fuel and air are supplied, ignition occurs.

Figure 5:
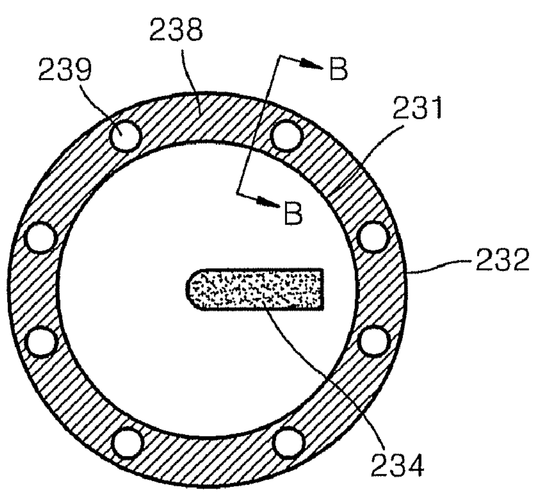
FIG. 5 is a plan view of the fuel reformer burner seen from a direction indicated by the arrow A of FIG. 4.
Figure 6:
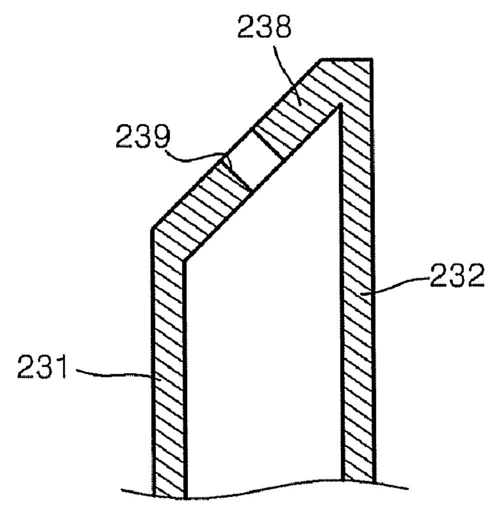
FIG. 6 is a cross-sectional view taken along line B-B of FIG. 5.

FIG. 5 is a plan view of the fuel reformer burner 230 seen from a direction indicated by arrow A of FIG. 4, and FIG. 6 is a cross-sectional view taken along line B-B of FIG. 5. Referring to FIGS. 5 and 6, a plurality of ejection holes 239 through which hydrogen gas is ejected are formed on an ejection surface 238 of the second tube 232. The shape of the ejection holes 239 is not limited to a circular shape, but can instead be formed in a slit shape or other polygonal shape. The ejection surface 238 can be formed to be angled 45 to 90 degrees with respect to the lengthwise direction of the second tube 232, and the ejection holes 239 can be approximately perpendicular with respect to the ejection surface 238. The structure of the ejection surface 238 of the second tube 232 is provided to generate a smooth combustion between hydrogen gas ejected from the ejection holes 239 and oxygen (air) supplied from the first tube 231. In particular, in the present embodiment, anode-off hydrogen (AOG) or hydrogen gas by-passed from the hydrogen by-pass line 182 does not contact oxygen in the second tube 232, and thus, combustion does not occur in the second tube 232. Accordingly, the combustion of the anode-off hydrogen (AOG) occurs when the anode-off hydrogen (AOG) contacts oxygen ejected from the first tube 231, and as a result, diffusion combustion occurs. Therefore, occurrence of back fire in the fuel reformer burner 230 can be prevented when hydrogen gas, which has a high combustion speed, is burnt.

Figure 7:
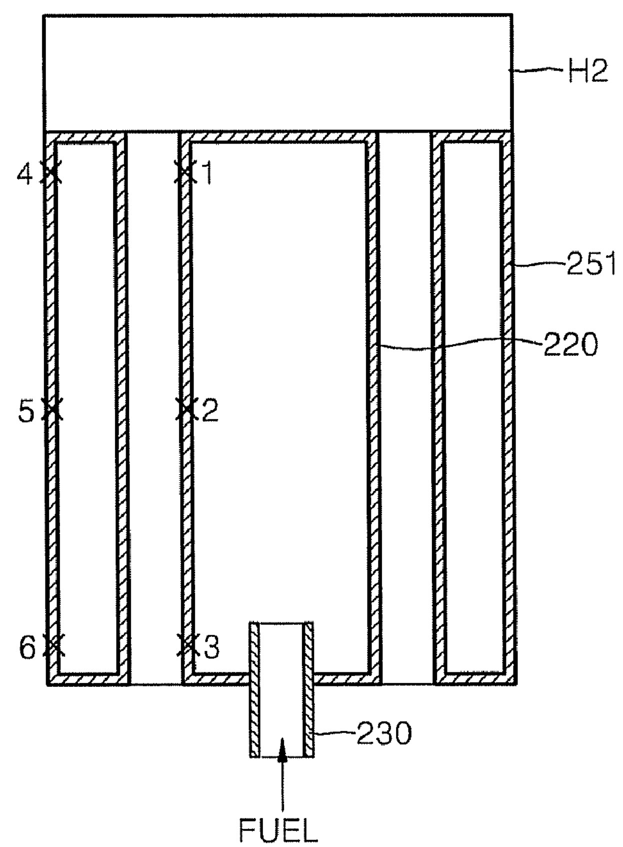
FIG. 7 is a cross-sectional view showing temperature measuring locations in a fuel reformer and a shift reactor.

With reference to FIG. 7, Table 1 summarizes test results of a temperature distribution of the fuel processor 200 that uses the fuel reformer burner 230 according to aspects of the present invention.

TABLE 1

| | Position | Without AOG | With AOG |
|---|---|---|---|
| Reformer | 1 | 491 | 477 |
| | 2 | 648 | 608 |
| | 3 | 761 | 711 |
| Shift reactor | 4 | 229 | 220 |
| | 5 | 276 | 263 |
| | 6 | 314 | 297 |

Positions 1 to 6 are temperature measuring points on the fuel reformer 220 and the CO shift reactor 251 of FIG. 7. 4.2 Nl/min of methane and 9.4 Nl/min of water were supplied to the fuel processor 200 as fuel. N indicates that the volume of methane is converted to a standard temperature and pressure (25° C. at 1 atm).

When AOG is not used, 2.1 Nl/min of methane (1.29 kW) and 25.8 Nl/min of air were supplied to the fuel reformer burner. When AOG is used, assuming that the hydrogen usage in the fuel cell stack is 80%, 0.92 Nl/min of methane (0.56 kW) and 22.8 Nl/min of air were supplied to the fuel reformer burner. Also, in order to simulate that the AOG contains $CO_2$, 3.3 Nl/min of hydrogen gas (0.70 kW) and 4 Nl/min of $CO_2$ were supplied to the fuel reformer burner. A total heat of fuel input to the fuel reformer burner was controlled to correspond to 1.29 kW in both cases when AOG was used and was not used.

Referring to Table 1, under a condition that the amount of fuel supplied to the fuel reformer 220 is fixed, when a portion of the fuel is replaced by AOG, although temperature is slightly reduced due to the introduction of $CO_2$, the fuel reformer 220 has a temperature distribution that can function as a fuel processor 200.

Figure 8:
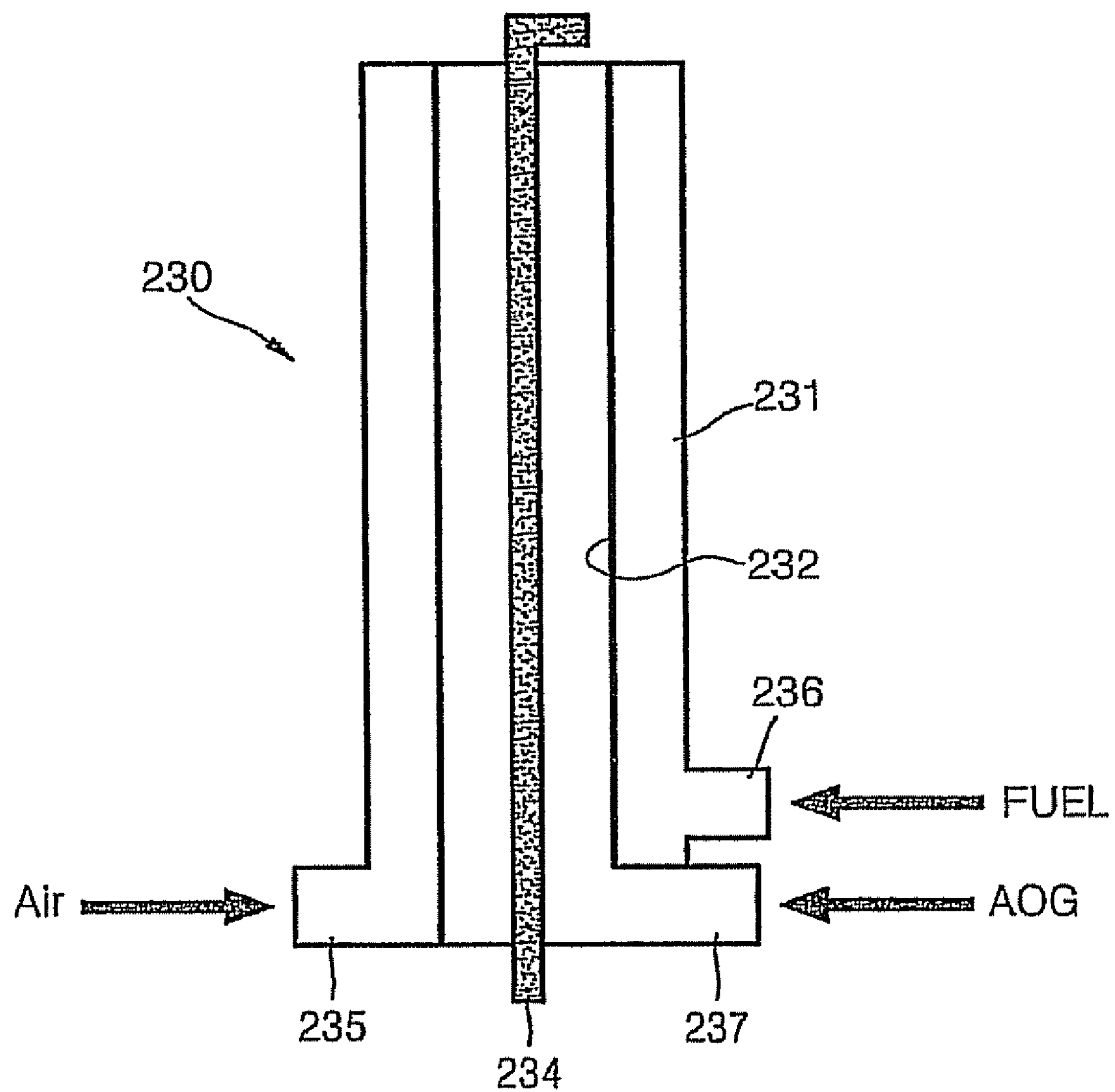
FIG. 8 is a cross-sectional view of a fuel reformer burner according to another embodiment of the present invention.

According to aspects of the present invention, the second tube 232 is formed around an outer circumference of the first tube 231, but aspects of the present invention are not limited thereto. That is, the first tube 231 can be formed around an outer circumference of the second tube 232 as shown in FIG. 8.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel reformer burner, comprising:

a first tube through which a fuel for a fuel reformer is supplied;

a second tube through which an anode-off gas (AOG) is supplied from a fuel cell stack;

an air inlet tube through which air is supplied to the first tube is connected to the first tube, and an ejection surface disposed between a first end of the first tube and a first end of the second tube through which a plurality of ejection holes are formed and through which the AOG is ejected;

wherein an inlet of the second tube is not connected to an inlet of the first tube.

2. The fuel reformer burner of claim 1, wherein the second tube and the first tube are concentric.

3. The fuel reformer burner of claim 2, wherein the second tube is inside a circumference of the first tube.

4. The fuel reformer burner of claim 2, wherein the second tube is outside a circumference of the first tube.

5. The fuel reformer burner of claim 1, wherein the ejection surface is angled between about 45 to 90 degrees with respect to a lengthwise direction of the second tube, and the ejection holes are approximately perpendicular to the ejection surface.

6. The fuel reformer burner of claim 1, wherein the first end of the second tube extends beyond the first end of the first tube such that the ejection surface is angled greater than about 45 degrees but less than 90 degrees with respect to a lengthwise direction of the second tube.

7. The fuel reformer burner of claim 6, wherein the first end of the second tube extends beyond the first end of the first tube such that the ejection surface is angled at about 45 degrees with respect to a lengthwise direction of the second tube.

8. The fuel reformer burner of claim 6, wherein the ejection holes are approximately perpendicular to the ejection surface.

9. The fuel reformer burner of claim 1, wherein the ejection holes are circular or slit shaped.

10. The fuel reformer burner of claim 1, further comprising an AOG inlet tube through which the AOG is supplied from the fuel cell stack to the second tube is connected to the second tube.

11. The fuel reformer burner of claim 1, further comprising an electric igniter disposed in the first tube to generate a spark between an end of the electric igniter and the first tube upon application of a predetermined direct current voltage.

12. A fuel cell system, comprising:
- a fuel reformer burner, comprising:
  - a first tube through which a fuel for a fuel reformer is supplied;
  - a second tube through which an anode-off gas (AOG) is supplied from a fuel cell stack;
  - an air inlet line through which air is supplied to the first tube is connected to the first tube;
  - an AOG supply line connected from the fuel cell stack to the second tube to supply the anode-off gas (AOG) to the second tube; and
  - an ejection surface disposed between a first end of the first tube and a first end of the second tube through which a plurality of ejection holes are formed and through which the AOG is ejected;
- wherein an inlet of the second tube is not connected to an inlet of the first tube.

13. The fuel cell system of claim 12, further comprising a hydrogen by-pass line connected from a point between the fuel reformer and the fuel cell stack to the second tube to flow hydrogen generated from the fuel reformer to the fuel reformer burner without passing through the fuel cell stack.

14. The fuel cell system of claim 13, wherein the point between the fuel reformer and the fuel cell stack is between a CO removing unit and the fuel cell stack.

15. The fuel cell system of claim 14, wherein the CO removing unit comprises:
- a CO shift reactor; and
- a CO remover,
- wherein the point between the fuel reformer and the fuel cell stack is between the CO remover and the fuel cell stack.

16. The fuel cell system of claim 12, further comprising a hydrogen by-pass line connected at a point between the fuel reformer and the fuel cell stack to the AOG supply line to flow hydrogen generated from the fuel reformer to the fuel reformer burner without passing through the fuel cell stack.

17. The fuel cell system of claim 12, further comprising an air inlet tube through which air is supplied to the first tube is connected to the first tube.

18. The fuel cell system of claim 1, wherein the first end of the second tube extends beyond the first end of the first tube such that the ejection surface is angled greater than about 45 degrees but less than 90 degrees with respect to a lengthwise direction of the second tube.

19. The fuel cell system of claim 12, wherein the fuel reformer burner further comprises an electric igniter disposed in the first tube to generate a spark between an end of the electric igniter and the first tube upon application of a predetermined direct current voltage.

20. A fuel cell system, comprising:
- a fuel reformer to reform a fuel to produce hydrogen;
- a fuel cell stack to generate electricity from the hydrogen and air; and
- a fuel reformer burner, comprising:
  - a first tube through which a fuel for a fuel reformer is supplied;
  - a second tube through which an anode-off gas (AOG) is supplied from the fuel cell stack;
  - an air inlet tube through which air is supplied to the first tube is connected to the first tube;
  - an AOG supply line connected from the fuel cell stack to the second tube to supply the AOG to the second tube; and
  - an ejection surface disposed between a first end of the first tube and a first end of the second tube through which a plurality of ejection holes are formed and through which the AOG is ejected;
- wherein an inlet of the second tube is not connected to an inlet of the first tube.

21. The fuel reformer burner of claim 20, wherein hydrogen is supplied directly to the second tube from a hydrogen by-pass line connected at a point between the fuel reformer and the fuel cell stack to flow hydrogen generated from the fuel reformer to the fuel reformer burner without passing through the fuel cell stack.

22. The fuel reformer burner of claim 20, wherein hydrogen is supplied to the AOG supply line from a hydrogen by-pass line connected at a point between the fuel reformer and the fuel cell stack to flow hydrogen generated from the fuel reformer to the fuel reformer burner without passing through the fuel cell stack.

* * * * *